United States Patent
Yang et al.

(10) Patent No.: US 8,031,281 B2
(45) Date of Patent: Oct. 4, 2011

(54) LIQUID CRYSTAL DISPLAY HAVING CAPACITORS AS PROTECTION ELEMENTS

(75) Inventors: Kuan-Yi Yang, Miao-Li (TW); Chao-Chih Lai, Miao-Li (TW); Kuo-Kuang Su, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 395 days.

(21) Appl. No.: 12/386,023

(22) Filed: Apr. 13, 2009

(65) Prior Publication Data

US 2009/0256981 A1    Oct. 15, 2009

(30) Foreign Application Priority Data

Apr. 11, 2008  (CN) .......................... 2008 1 0066572

(51) Int. Cl.
*G02F 1/1333*  (2006.01)
*G02F 1/1343*  (2006.01)
*G02F 1/133*   (2006.01)

(52) U.S. Cl. ............................ 349/40; 349/38; 349/33

(58) Field of Classification Search .................... 349/40, 349/38, 33
See application file for complete search history.

(56) References Cited

U.S. PATENT DOCUMENTS

| | | | |
|---|---|---|---|
| 5,233,448 A * | 8/1993 | Wu | 349/40 |
| 5,371,351 A * | 12/1994 | Van Berkel | 250/208.1 |
| 6,175,394 B1 * | 1/2001 | Wu et al. | 349/40 |
| 6,900,599 B2 | 5/2005 | Ribarich | |
| 7,755,875 B2 * | 7/2010 | Kobashi | 361/111 |

FOREIGN PATENT DOCUMENTS

| CN | 101035404 A | 9/2007 |
|---|---|---|
| JP | 4-130312 A | 5/1992 |

* cited by examiner

*Primary Examiner* — Mike Qi
(74) *Attorney, Agent, or Firm* — Altis Law Group, Inc.

(57) ABSTRACT

An exemplary liquid crystal display panel includes a substrate, parallel gate lines disposed on the substrate, parallel source lines disposed on the substrate and crossing the gate lines insultingly, and first protection elements and second protection elements electrically connected to the gate lines and the source lines respectively. The first and second protection elements are capacitors, which can break down to discharge electrostatic buildup therein.

20 Claims, 1 Drawing Sheet

LIQUID CRYSTAL DISPLAY HAVING CAPACITORS AS PROTECTION ELEMENTS

BACKGROUND

1. Technical Field

The present disclosure relates to liquid crystal displays (LCDs), and more particularly to an LCD having a protection element. The protection element can be used for protecting a driver of the LCD when an electrostatic discharge (ESD) takes place in the LCD.

2. Description of Related Art

LCDs are commonly used as display devices for compact electronic apparatuses, because they not only are very thin but also provide good quality images with little power consumption.

During an LCD manufacturing process, static charge may be generated and build up in the LCD. Static charge may enter the LCD from exterior objects or operators when they contact the LCD. For example, static charge in a human operator may be transmitted to the LCD via a so-called human body mode (HBM) when the operator handles the LCD. If too much static charge builds up at any one location on the LCD, the static charge is liable to discharge suddenly. This phenomenon is known as ESD. The ESD may damage or destroy internal components of the LCD such as metal signal lines, thin film transistors (TFTs), and the like. Thus a means for safely discharging electrostatic buildup in an LCD is desired.

DETAILED DESCRIPTION

Reference will now be made to the drawings to describe embodiments of the present disclosure in detail.

Figure 1:
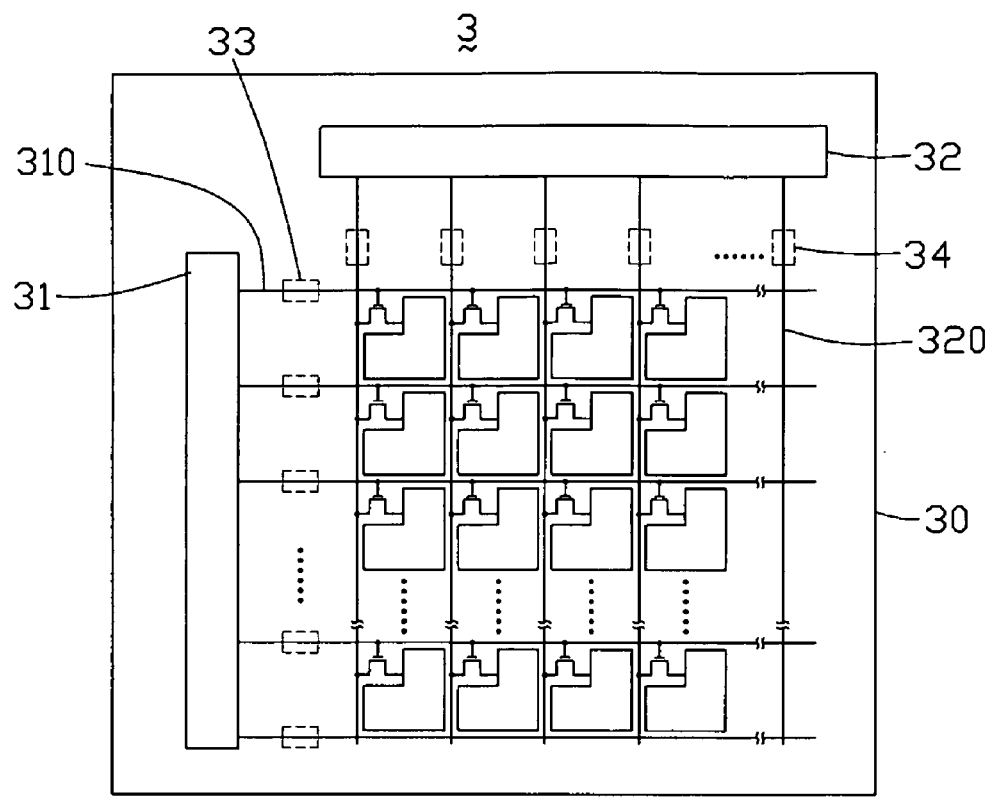
FIG. 1 is an abbreviated, plan view of a liquid crystal display panel according to a first embodiment of the present disclosure.

Referring to FIG. 1, a liquid crystal display panel 3 according to a first embodiment includes a first substrate 30, a second substrate (not shown) generally opposite to the first substrate 30, and a liquid crystal cell (not shown) disposed between the first substrate 30 and the second substrate.

The first substrate 30 includes a base plate (not labeled), a gate driver 31, a source driver 32, a plurality of gate lines 310, a plurality of source lines 320 crossing the plurality of gate lines 310, a plurality of first protection elements 33, and a plurality of second protection elements 34. An output of the gate driver 31 is connected to the gate lines 310 to output gate signals thereto. Outputs (not labeled) of the source driver 32 are respectively connected to the source lines 320 to drive the source lines 320. Each first protection element 33 is electrically connected to one of the gate lines 310 and disposed adjacent to the gate driver 31. Similarly, each second protection element 34 is electrically connected to one of the source lines 320 and disposed adjacent to the source driver 32.

The first protection elements 33 and the second protection elements 34 have essentially the same structure. Each first protection element 33 includes a first metal layer (not shown), a second metal layer (not shown) generally opposite to the first metal layer, and an amorphous silicon layer (not shown) sandwiched between the first metal layer and the second metal layer. The first metal layer is electrically connected to the gate line 310. The second metal layer is electrically connected to a discharge circuit (not shown) such as a grounded circuit. The first metal layer, the second metal layer, and the amorphous silicon layer are used to form a capacitor for collecting static charge. When the amount of collected static charge in the capacitor reaches a predetermined level, the voltage between the first metal layer and the second metal layer reaches to a breakdown voltage of the amorphous silicon layer. Thereupon the capacitor starts to discharge the static charge.

Compared with a convention LCD, each of the first and second protection elements 33, 34 includes the first metal layer, the second metal layer and the amorphous silicon layer cooperatively forming a capacitor that is capable of timely discharging electrostatic buildup. In addition, the structure of the first and second elements 33, 34 is simple. Because the amorphous silicon layer is broken down when the collected static charge reaches a threshold level, the capacitor can discharge the electrostatic buildup effectively and timely.

Figure 2:
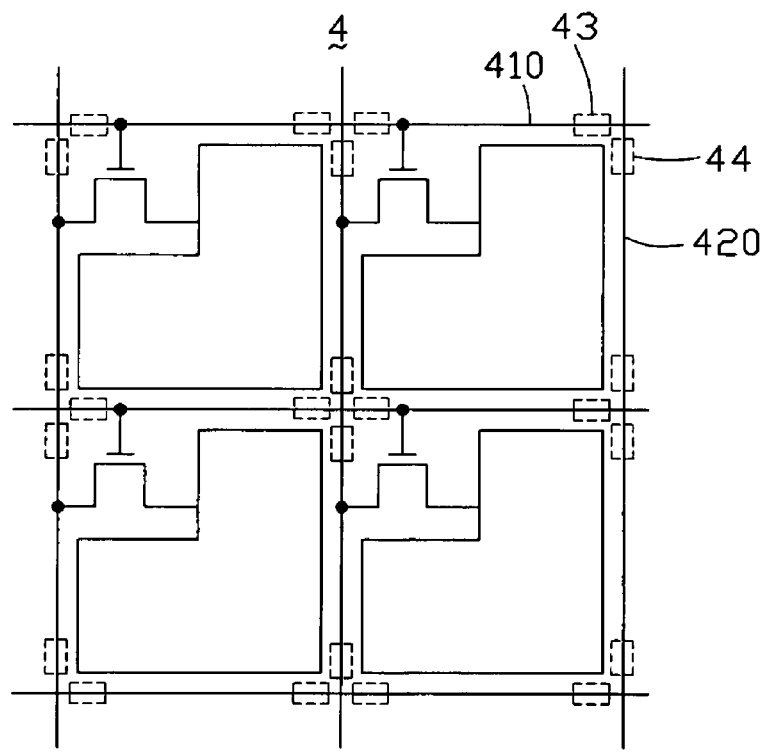
FIG. 2 is an abbreviated, plan view of a part of a liquid crystal display panel according to a second embodiment of the present disclosure.

Reference to FIG. 2, a liquid crystal display panel 4 according to a second embodiment is similar to the liquid crystal display panel 3. However, in the liquid crystal display panel 4, at least one first protection element 43 and at least one second protection element 44 is disposed around each intersection of gate lines 410 and source lines 420. In the illustrated embodiment, two first protection elements 43 and two second protection elements 44 are disposed around each intersection of the gate lines 410 and the source lines 420. A first metal layer (not shown) of each first protection element 43 is electrically connected to the corresponding gate line 410. A first metal layer of each second protection element 44 is electrically connected to the corresponding source line 420. A second metal layer of the first protection element 43 and a second metal layer of the second protection element 44 are connected to a discharge circuit (not shown) of the liquid crystal display panel 4. The liquid crystal display panel 4 having plural protection elements 43, 44 around each intersection of the gate lines 410 and the source lines 420 can discharge electrostatic buildup effectively and timely.

Other embodiments of the present liquid crystal display panel can include the following. For example, the structure of each of the first and second protection elements can include a first metal layer, a second metal layer, an amorphous silicon layer, and an insulating layer. The first metal layer and the second metal layer are generally opposite to each other. The amorphous silicon layer and the insulating layer are disposed between the first metal layer and the second metal layer. The insulating layer is disposed close to the first metal layer. With this structure, the insulating layer also can be used to eliminate excessive electrostatic buildup. Thus, the protection element can eliminate excessive electrostatic buildup.

In another example which is a variation of the second embodiment, two first protection elements 43 and two second protection elements 44 are disposed around every intersection of the gate lines 410 and the source lines 420, except for intersections that are at an outmost periphery of the grid of intersections formed by the crossing gate lines 410 and source lines 420.

It is believed that the present embodiments and their advantages will be understood from the foregoing description, and it will be apparent that various changes may be made thereto without departing from the spirit or scope of the disclosure or sacrificing all of its material advantages.

What is claimed is:
1. A liquid crystal display panel, comprising:
   a substrate;

a plurality of gate lines disposed on the substrate, the gate lines substantially parallel to each other;

a plurality of source lines disposed on the substrate, the source lines substantially parallel to each other and crossing the gate lines; and a plurality of first protection elements and second protection elements electrically connected to the gate lines and the source lines, respectively, wherein the first and second protection elements are capacitors which can break down upon collecting a threshold amount of static charge to thereby discharge the static charge.

2. The liquid crystal display panel of claim 1, wherein each gate line is electrically connected to at least one first protection element and each source line is electrically connected to at least one second protection element.

3. The liquid crystal display panel of claim 2, wherein each of the first and second protection elements comprises a first metal layer, a second metal layer generally opposite to the first metal layer, and an amorphous silicon layer between the first metal layer and the second metal layer.

4. The liquid crystal display panel of claim 3, wherein each of the first and second protection elements further comprises an insulating layer, which is between the first metal layer and the amorphous silicon layer.

5. The liquid crystal display panel of claim 4, wherein the first metal layer of each first protection element is electrically connected to the gate line, the first metal layer of each second protection element is electrically connected to the source line, and the second metal layer of each first protection element and each second protection element is electrically connected to a discharge circuit.

6. The liquid crystal display panel of claim 5, further comprising a gate driver configured to output gate signals to the gate lines and a source driver configured to output source signals to the source lines.

7. The liquid crystal display panel of claim 6, wherein at least one first protection element and at least one second protection element are disposed around each intersection of the gate lines and the source lines.

8. The liquid crystal display panel of claim 7, wherein two first protection elements and two second protection elements are disposed around each intersection of the gate lines and the source lines.

9. The liquid crystal display panel of claim 8, wherein said two first protection elements are electrically connected to the same gate line, and said two second protection elements are electrically connected to the same source line.

10. The liquid crystal display panel of claim 7, wherein two first protection elements and two second protection elements are disposed around each intersection of the gate lines and the source lines, except for intersections that are at an outmost periphery of the grid of intersections formed by the crossing gate lines and source lines.

11. A liquid crystal display panel, comprising:
a substrate;
a plurality of gate lines disposed on the substrate, the gate lines substantially parallel to each other;
a plurality of source lines disposed on the substrate, the source lines substantially parallel to each other and crossing the gate lines; and
a plurality of first and second protection elements electrically connected to the gate lines and the source lines, respectively, wherein the first and second protection elements are plural-layer capacitors, with one of the layers of the capacitor of each first protection element electrically connected to the gate line, and one of the layers of the capacitor of each second protection element electrically connected to the source line.

12. The liquid crystal display panel of claim 10, wherein each gate line is electrically connected to at least one first protection element, and each source line is electrically connected to at least one second protection element.

13. The liquid crystal display panel of claim 11, wherein the layers of each of the first and second protection elements comprise a first metal layer, a second metal layer generally opposite to the first metal layer, and an amorphous silicon layer between the first metal layer and the second metal layer.

14. The liquid crystal display panel of claim 12, wherein the layers of each of the first and second protection elements further comprise an insulating layer, which is between the first metal and the amorphous silicon layer.

15. The liquid crystal display panel of claim 13, wherein the first metal layer of each first protection element is electrically connected to the gate line, the first metal layer of each second protection element is electrically connected to the source line, and the second metal layer of each first protection element and each second protection element is electrically connected to a discharge circuit.

16. The liquid crystal display panel of claim 14, further comprising a gate driver configured to output gate signals to the gate lines, and a source driver configured to output source signals to the source lines.

17. The liquid crystal display panel of claim 15, wherein at least one first protection element and at least one second protection element are disposed around each intersection of the gate lines and the source lines.

18. The liquid crystal display panel of claim 17, wherein said two first protection elements are electrically connected to the same gate line, and said two second protection elements are electrically connected to the same source line.

19. The liquid crystal display panel of claim 16, wherein two first protection elements and two second protection elements are disposed around each intersection of the gate lines and the source lines.

20. A liquid crystal display panel, comprising:
a substrate;
a plurality of gate lines disposed on the substrate, the gate lines substantially parallel to each other;
a plurality of source lines disposed on the substrate, the source lines substantially parallel to each other and crossing the gate lines; and
a plurality of plural-layer capacitors electrically connected to the gate lines and the source lines, respectively, wherein one of the metal layers of the capacitor of each first protection element electrically connected to the gate line, and one of the layers of the capacitor of each second protection element electrically connected to the source line.

* * * * *